(No Model.)

C. A. FAURE.
SECONDARY BATTERY.

No. 383,560. Patented May 29, 1888.

Witnesses:
E. E. Masson.
Philip Mauro

Inventor:
Camille A. Faure
by A. Pollok
his attorney.

United States Patent Office.

CAMILLE A. FAURE, OF PARIS, FRANCE, ASSIGNOR TO THE ELECTRICAL ACCUMULATOR COMPANY, OF NEW YORK.

SECONDARY BATTERY.

SPECIFICATION forming part of Letters Patent No. 383,560, dated May 29, 1888.

Original application filed April 20, 1881, Serial No. 31,277. Divided and this application filed October 7, 1881. Serial No. 43,401.
(No model.) Patented in France February 9, 1881, No. 141,057.

*To all whom it may concern:*

Be it known that I, CAMILLE ALPHONSE FAURE, of Paris, in the Republic of France, have invented certain Improvements in Secondary Electric Batteries, (for which Letters Patent have been granted in France, No. 141,057, dated February 9, 1881,) of which improvements the following specification is a full description.

This invention has reference to the batteries invented or discovered by Ritter and by Planté and improved by myself, which, being included for a time in circuit with a suitable source of electricity, when the latter is removed and the circuit again completed, give out the electricity absorbed, so to speak, and thus store the electricity as in a reservoir. These batteries, commonly known as "polarization" or "secondary" batteries, consist, generally, of metal plates serving as electrodes, immersed in a battery-fluid or electrolytic liquid. The best metal for the electrodes has been found by Planté, in his laborious researches, to be lead, and the best liquid for the electrolytic or battery-fluid a dilute (ten per cent.) solution of sulphuric acid in water.

My present invention consists in combining with or covering the plates, elements, or electrodes (which are not necessarily of lead or even of metal, but may be of other material adapted to the purpose) prior to immersion in the battery-fluid or electrolyte, with active material, and especially with red lead, (minium,) in the form of a paste. Perforated or porous material, which will allow free contact of the electrolyte or battery-fluid with the electrodes or plates, may be used to prevent the dropping off of particles of the coating during the use of the battery, although the coating can be used without such retaining medium.

The forms, proportions, and general arrangement of the plates, including the absolute or relative thickness of the lead plate and red-lead covering, can be indefinitely modified or varied within wide limits.

Figure 1:
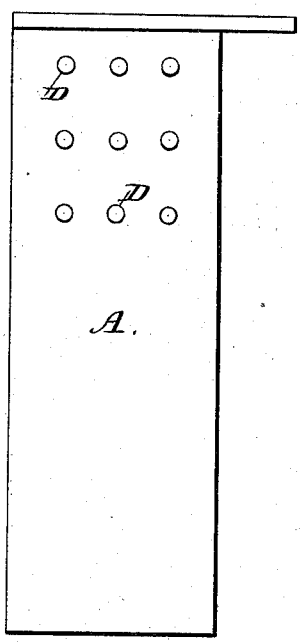
Figure 2:
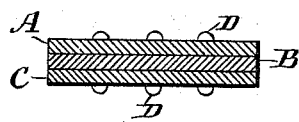

The accompanying drawings, which form a part of this specification, illustrate a most advantageous construction, Figure 1 being an elevation, and Fig. 2 a cross-section, of the battery-plate.

A is a leaden plate; B, a layer of red lead; C, a piece of felt, and D lead rivets for fastening to the lead plate the felt which holds the red lead in place. A single cell consists of two such plates immersed in the battery-fluid (or electrolytic liquid)—dilute sulphuric acid, for example—in which the active material is practically insoluble. Any number of cells can of course be formed, as well understood in the art.

This application is a division and continuation of my application filed April 20, 1881, Serial No. 31,277, patented January 3, 1882, No. 252,202.

Having now fully described my said invention and the manner of carrying the same into effect, what I claim is—

1. The method of preparing the elements of secondary batteries, which consists in applying to the plates or supports the active material in the form of a paste prior to immersion of the elements in the battery-fluid, substantially as described.

2. The method of preparing the elements of secondary batteries by applying to the plates active material consisting of red lead in the form of a paste prior to the immersion in the battery-fluid, substantially as described.

3. The process of construction of a secondary battery, which consists in first preparing the active material as a paste, then combining the same with the electrodes, and then placing the same in a battery-cell containing an electrolytic liquid, in which such active material is practically insoluble, substantially as described.

In witness whereof I have hereunto signed my name in the presence of two subscribing witnesses.

C. A. FAURE.

Witnesses:
 A. POLLOK,
 F. PHILIPPARD.